United States Patent [19]
Richter

[11] 3,929,164
[45] Dec. 30, 1975

[54] FLUID TRANSFER UMBILICAL ASSEMBLY FOR USE IN ZERO GRAVITY ENVIRONMENT

[76] Inventor: Harold J. Richter, Rte. 3, Box 55, Evergreen, Colo. 80439

[22] Filed: Sept. 8, 1972

[21] Appl. No.: 287,342

Related U.S. Application Data

[62] Division of Ser. No. 118,694, Feb. 25, 1971, abandoned.

[52] U.S. Cl. ............ 138/120; 138/103; 138/DIG. 8; 285/114
[51] Int. Cl. ............................................. F16l 11/12
[58] Field of Search ........... 138/113, 114, 118, 120, 138/137, 178, DIG. 8; 285/114

[56] References Cited
UNITED STATES PATENTS

| | | | |
|---|---|---|---|
| 832,523 | 10/1906 | Andersson | 138/120 |
| 973,901 | 10/1910 | Witeenmann | 285/114 |
| 2,707,972 | 5/1955 | Cole, Jr. et al | 285/114 |
| 2,758,612 | 8/1956 | Zaleski | 285/114 |
| 2,908,295 | 10/1959 | Beazley | 285/114 |
| 3,096,962 | 7/1963 | Meijs | 138/120 |
| 3,190,286 | 6/1965 | Stokes | 138/120 |
| 3,222,092 | 12/1965 | Olson | 285/114 |

Primary Examiner—Herbert Goldstein
Attorney, Agent, or Firm—Phillip L. DeArment; Gay Chin; James G. O'Boyle

[57] ABSTRACT

A fluid transfer umbilical assembly for use in a zero gravity environment, the umbilical being constructed and arranged to contain the end forces developed during pressurization of the umbilical, thereby preventing elongation or longitudinal growth, whereby the umbilical is maintained flexible to facilitate the maneuverability of an astronaut to whom the line is attached. The umbilical assembly may include a single tube or hose, or a cluster of tubes, and in one embodiment a tensioned cable extends longitudinally within the umbilical assembly and is connected at each end to a respective end fitting on the umbilical assembly. In another embodiment, in lieu of the tensioned cable, a cluster of tubes is positioned within an outer retaining jacket which is pressurized thereby permitting the design of the inner tubes to be based on a pressure differential. The umbilical assembly may be encapsulated by a ball and socket-type housing adapted to be selectively placed in compression thus rigidifying the entire length of the umbilical, whereby the position and particular shape of the umbilical at the time of compression of the housing will be maintained.

1 Claim, 13 Drawing Figures

INVENTOR
HAROLD J. RICHTER
BY Brady, O'Boyle + Gates
ATTORNEYS

INVENTOR
HAROLD J. RICHTER

BY Brady, O'Boyle & Gates

ATTORNEYS

FLUID TRANSFER UMBILICAL ASSEMBLY FOR USE IN ZERO GRAVITY ENVIRONMENT

This is a division of application Ser. No. 118,694, filed Feb. 25, 1971 now abandoned.

BACKGROUND OF THE INVENTION

In a zero gravity environment, it has been found that conventional fluid transfer lines or umbilicals, when pressurized, become stiff and exert constraining forces thereby impeding the maneuverability of an astronaut to whom the line is attached during the performance of his work experiments. This stiffness in the pressurized umbilical is caused by the longitudinal cords or fibers in the umbilical sheath performing their function of retaining the end or longitudinal forces developed in the umbilical during pressurization. To overcome the disadvantages experienced in hitherto employed umbilicals, the umbilical assembly of the present invention has been devised to improve maneuverability in space, to minimize the required storage space during the launching phase, and to provide an assembly by which an astronaut can maintain a fixed attitude once a desired position at a work station has been attained.

The assembly of the present invention comprises, essentially, a single tube or hose, or alternatively, a cluster of tubes, having a tensioned cable extending longitudinally within the umbilical assembly and connected at each end to a respective end fitting on the umbilical assembly. In another embodiment, in lieu of the tensioned cable, a pressurized retaining jacket surrounds the umbilical assembly to thereby maintain the flexibility of the assembly based on a pressure differential. The umbilical assembly may be encapsulated by a ball and socket-type housing adapted to be selectively placed in compression thus rigidifying the entire length of the umbilical, whereby the orientation and particular shape of the umbilical at the time of compression of the housing will be maintained.

IN THE DRAWINGS

Figure 1:
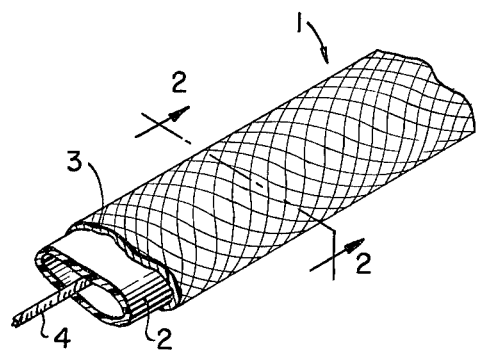
FIG. 1 is a fragmentary, perspective view, partly in section, illustrating a flat non-pressurized umbilical with an internal cable.
Figure 9:
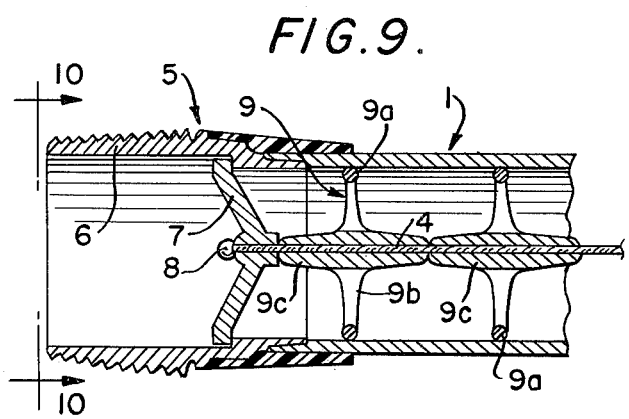
FIG. 9 is a fragmentary, side elevational view, in section, of the end connections and an internal cable centering device.
Figure 10:
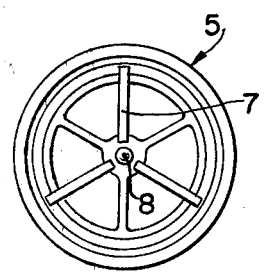
FIG. 10 is a view taken along line 10—10 of FIG. 9.

Referring to the drawings and more particularly to FIGS. 1 and 9, the umbilical of the present invention comprises a tube or hose 1 including an inner liner 2 of thin, flexible, fluid compatible material and a stress bearing outer jacket 3 formed from flat woven belting designed to contain all working stresses of the pressurized fluid in the hose. Conventional umbilicals or hoses are similar in construction to the umbilical thus far described; that is, the umbilicals usually consist of an inner liner of fluid compatible material, a sheath of woven stress bearing fibrous material of various circumferential patterns extending throughout its entire length and an outer layer of scuff or wear resistant material. When umbilicals of this construction are pressurized, they become stiff due to the longitudinal cords or fibers in the sheath performing their function of retaining the end or longitudinal forces developed in the umbilical during pressurization. It has been found that the stiffness of a pressurized umbilical exerts constraining forces thereby impeding the maneuverability of an astronaut to whom the line is attached.

To overcome the disadvantage of stiffness during pressurization of the umbilical, the hose of the present invention is provided with a cable 4 positioned within the umbilical and having each end attached to its respective end fitting 5, as shown in FIG. 9. The end fitting includes a threaded sleeve 6 secured to the end of the hose and having a spider or cable end retainer 7 mounted therein to which the end of the cable 4 is secured through a retaining ball 8. The cable 4 contains the end forces developed during pressurization, thus preventing elongation or longitudinal growth of the cords or fibers in the sheath thereby precluding the umbilical from becoming stiff during pressurization. By varying the length ratio of the cable to the umbilical, various coiled configurations can be attained during pressurization. The coiling effect shortens the effective length of the umbilical which can be controlled by either varying the cable-to-umbilical length ratio or by varying the working pressure of the fluid flowing through the umbilical. The cable-to-umbilical length ratios are varied by placing the outer jacket 3 of the umbilical in compression by attaching a tension device to the cable 4 and pulling against the end fitting 5. When a predetermined length ratio is attained, as defined by a mark on the cable, the retaining ball 8 is welded or swaged to the cable. The cable end retainer 7 can also be designed to include a threaded sleeve for adjusting the cable length after assembly. It will be readily apparent to those skilled in the art that the tensioned cable 4 not only maintains the umbilical flexible but also facilitates the coiling effect when the umbilical is pressurized, thus enhancing the maneuverability of an astronaut in the performance of his work in a zero gravity environment.

Figure 2:
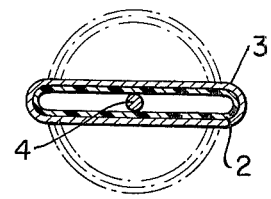
FIG. 2 is a view taken along line 2—2 of FIG. 1 and showing, in phantom, the circular cross-section assumed by the umbilical when pressurized.

FIG. 1 illustrates a flat, non-pressurized umbilical with an internal cable; when pressurized, the umbilical rounds out in cross section as shown in phantom in FIG. 2. Non-pressurized, the umbilical returns to a flat cross section which facilitates compact coiling of the umbilical for stowage purposes.

Figure 3:
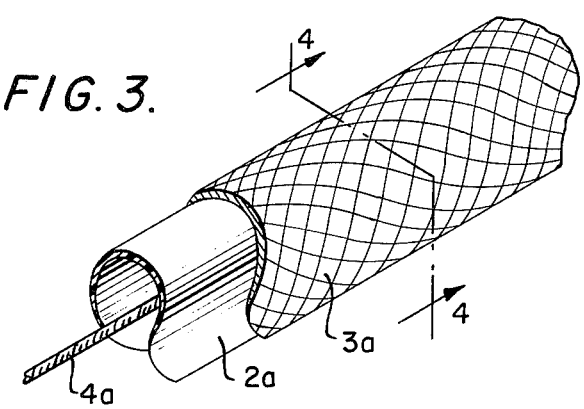
FIG. 3 is a fragmentary, perspective view, partly in section, illustrating an umbilical having a circular cross-section in the non-pressurized state with an internal cable.
Figure 4:
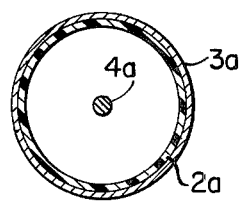
FIG. 4 is a view taken along line 4—4 of FIG. 3.

Referring to FIG. 3, the umbilical illustrated therein is identical in structure to that shown in FIG. 1 except that the inner liner 2a is of a heavier wall thickness which enables retention of its round cross section in the non-pressurized state.

Figure 11:
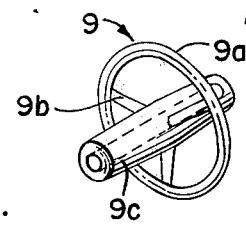
FIG. 11 is a perspective view of a cable centering device employed in the umbilical illustrated in FIG. 9.

While the cable 4a is shown free floating in the umbilical illustrated in FIG. 3, suitable internal supports 9 can be employed as shown in FIGS. 9 and 11, the supports including a rim portion 9a engaging the internal wall of the umbilical, the rim being supported by a plurality of spokes 9b integrally connected to a hub portion 9c through which the cable extends, the hub portions forming spacers between adjacent supports strung along the length of the cable.

Figure 5:
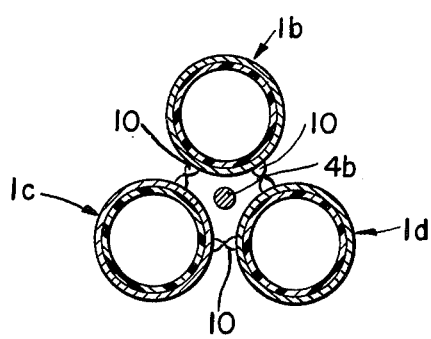
FIGS. 5 and 6 are sectional end elevational views showing two embodiments of an umbilical assembly employing a cluster or bundle of umbilicals of the type illustrated in FIGS. 1 and 3 but with a single cable per assembly.
Figure 6:
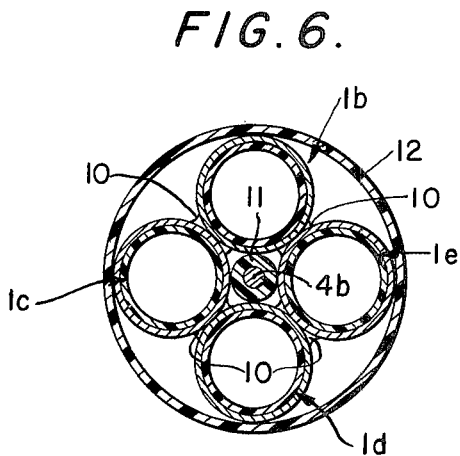

FIGS. 5 and 6 illustrate a cluster or bundle of umbilicals similar in construction to the umbilicals described in connection with FIGS. 1 and 3, the bundle including a plurality of tubes 1b, 1c, 1d and 1e each connected to the adjacent tube through suitable webbing or lacing 10 which permits relative axial movement between the tubes thus enhancing the flexibility of the bundle. The cable 4b extends longitudinally through the bundle, the cable shown in FIG. 6 being provided with a sheath 11 for reducing wear during usage; if desired, the bundle may be provided with an outer retaining jacket 12 as shown in FIG. 6.

Figure 13:
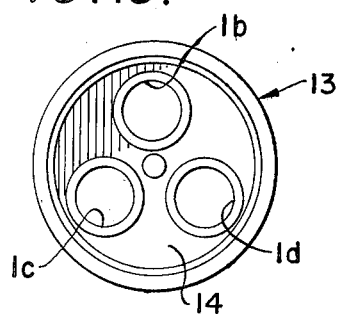
FIG. 13 is a view taken along line 13—13 of FIG. 12.
Figure 12:
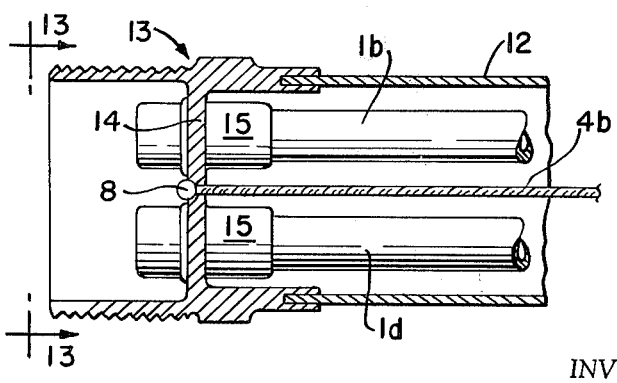
FIG. 12 is a fragmentary, side elevational view, in section, illustrating the end connections employed in the umbilical assembly shown in FIGS. 5 and 6.

The cable 4b is not attached to the bundle along the length thereof but at each end the cable is secured to a suitable fitting 13 shown in FIGS. 12 and 13, the fitting including a wall 14 through which the cable 4b extends, the tubes 1b, 1c and 1d also extending through the wall and mounted therein by suitable bushings 15.

Figure 8:
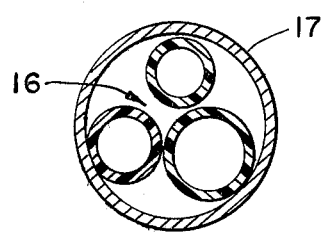
FIG. 8 is a sectional, end elevational view of another embodiment of an umbilical cluster or bundle.

While the umbilical assemblies shown in FIGS. 1, 3, 5 and 6 employ a cable to contain the end forces developed during pressurization to maintain the flexibility of the umbilical, FIG. 8 illustrates another embodiment of the inventive concept wherein, in lieu of the cable, the umbilical bundle 16 is enclosed by a spaced, outer retaining jacket 17. The space between the bundle 16 and outer jacket 17 is filled with a pressurized fluid the pressure of which permits the design of each tube, forming the bundle, to be based on a pressure differential rather than its own internal pressure. By this construction and arrangement, the tubes can be constructed with relatively thin walls and the employment of webbing or lacing to connect adjacent tubes in the bundle is precluded, the pressurized fluid contained in the outer jacket 17 also functioning as a lubricant to reduce friction between the tubes during usage.

Figure 7:
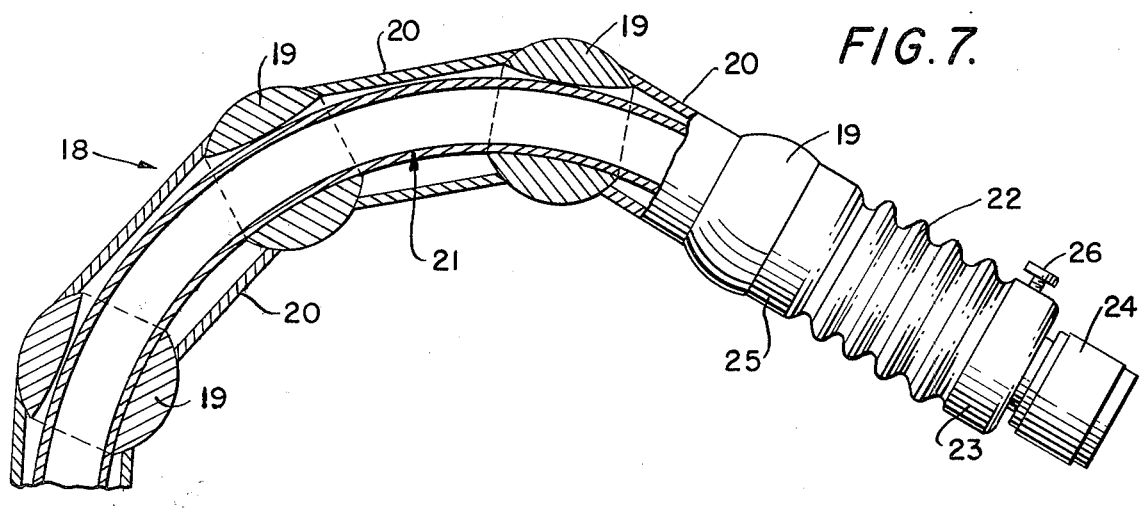
FIG. 7 is a side elevational view, partly in section, of a ball and socket-type housing employed for rigidizing the umbilical assembly.

The umbilical assemblies disclosed in FIGS. 1, 3, 5, 6 and 8 are constructed to enhance the maneuverability of an astronaut, to whom the line is attached, during the performance of his work experiments in space. At times, the astronaut might wish to maintain the flexible umbilical assembly at a fixed attitude once a desired position at a work station has been attained. In order to maintain the umbilical assembly at a fixed attitude, the assembly may be enclosed in a housing 18, as shown in FIG. 7, the housing comprising a plurality of spherical members 19 and tubular sockets 20 alternately positioned on the umbilical 21 and slidably supported thereon. By applying pressure to the end of the housing, the spherical members 19 and tubular sockets 20 are moved axially toward each other to thereby rigidify the housing and umbilical enclosed therein. While various actuators may be employed for shifting the spherical members 19 and tubular sockets 20 toward each other, by way of example, one type of actuator is shown in FIG. 7 and includes a bellows 22 having one end portion 23 fixedly secured to the umbilical supply line 24, the opposite end portion 25 of the bellows being slidably mounted on the umbilical supply line. A valve 26 is provided on the end portion 23 for controlling the umbilical fluid pressure to the bellows. By this construction and arrangement when valve 26 is moved to the open position pressurized fluid from the umbilical flows into the bellows to thereby expand the bellows thus sliding end portion 25 against the spherical member 19 which, in turn, transmits the rigidifying force to the remaining spherical members and tubular sockets, whereby the position and particular shape of the umbilical at the time the housing 18 is actuated will be maintained until the compression of the housing is released.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A fluid transfer umbilical assembly for use in a zero gravity environment comprising, hose means, means positioned within and operatively connected to said hose means for containing the end forces developed during pressurization of the umbilical, thereby preventing longitudinal growth of the umbilical, whereby the umbilical is maintained flexible to facilitate the maneuverability of an astronaut to whom the line is attached; a plurality of spherical members and tubular sockets alternately positioned on the hose means and slidably supported thereon, a bellows having one end fixedly mounted on the umbilical supply line, the opposite end of the bellows being slidably mounted on the umbilical supply line and adjacent one of the spherical members, and valve means connected to the bellows for controlling the flow of pressurized fluid from the umbilical supply line to the bellows, whereby when the valve means is opened pressurized fluid is allowed to flow into the bellows thereby expanding the bellows to slide said opposite end of the bellows axially toward said one spherical member which, in turn, transmits the rigidifying force to the remaining spherical members and tubular sockets, whereby the hose means may be selectively rigidified to thereby maintain the umbilical assembly at a fixed attitude once a desired position at a work station has been attained.

* * * * *